US006457028B1

(12) United States Patent
Pitkow et al.

(10) Patent No.: US 6,457,028 B1
(45) Date of Patent: *Sep. 24, 2002

(54) METHOD AND APPARATUS FOR FINDING RELATED COLLECTIONS OF LINKED DOCUMENTS USING CO-CITATION ANALYSIS

(75) Inventors: James E. Pitkow, Palo Alto; Peter L. Pirolli, San Francisco, both of CA (US)

(73) Assignee: Xerox Corporation, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/407,787

(22) Filed: Sep. 29, 1999

Related U.S. Application Data

(63) Continuation-in-part of application No. 09/044,693, filed on Mar. 18, 1998, now Pat. No. 6,038,574.

(51) Int. Cl.[7] .............................................. G06F 17/21
(52) U.S. Cl. .......................... 707/513; 707/5; 707/514; 707/901; 707/907
(58) Field of Search ............................... 707/513, 3, 5, 707/102, 514, 901, 907

(56) References Cited

U.S. PATENT DOCUMENTS

| | | | | |
|---|---|---|---|---|
| 5,761,497 A | * | 6/1998 | Holt et al. ....................... | 707/5 |
| 5,920,854 A | * | 7/1999 | Kirsch et al. .................... | 707/3 |
| 6,073,130 A | * | 6/2000 | Jacobson et al. ................ | 707/5 |
| 6,167,397 A | * | 12/2000 | Jacobson et al. ................ | 707/5 |
| 6,272,507 B1 | * | 8/2001 | Pirolli et al. ................... | 707/513 |

OTHER PUBLICATIONS

Botafogo et al., "Structural Analysis of Hypertexts: Identifying Hierarchies and Useful Metrics", *ACM Transactions on Information Systems*, vol. 10, No. 2, Apr. 1992, pp. 142–180.

Griffith et al., "The Structure of Scientific Literatures II: Toward a macro– and Microstructure for Science", *Science Studies*, 4 (1974), pp. 339–365

Larson, R.R., "Bibliometrics of the World Wide Web: An Exploratory Analysis of the Intellectual Structure of Cyberspace", *Proceedings of the 1996 American Society for Information Science Annual Meeting*, pp. 1–13.

Small, H., "Co–citation in the Scientific Literature: A New Measure of the Relationship Between Two Documents", *Journal of the American Society for Information Science*, Jul.–Aug. 1973, pp. 265–269.

* cited by examiner

*Primary Examiner*—Jean R. Homere

(57) ABSTRACT

A method and apparatus for identifying related collections of linked documents. In the method the links from a set of related documents are analyzed to identify a plurality of document collections. By analyzing only the link structure, a process intensive content analysis of the documents is avoided. A citation analysis technique, such as co-citation analysis, is performed on the set of documents to extract link information indicating links and link frequency between document collections. For co-citation analysis that information would include the frequency that both are linked to by another document collection. By using the link information, related document collections may then be identified using a suitable analysis technique, such as clustering or spreading activation.

13 Claims, 10 Drawing Sheets

| LIST 610 | CLUSTER 1 620 |
|---|---|
| 601->(A,D) 602->(A,B) 603->(B,D) 604->(Z,W) 605->(X,Y) 606->(X,W) 607->(Y,W) | 600->(C,D) |

*FIG. 6a*

| LIST 610 | CLUSTER 1 620 |
|---|---|
| 602->(A,B) 604->(Z,W) 605->(X,Y) 606->(X,W) 607->(Y,W) | 600->(C,D) 601->(A,D) 603->(B,D) |

*FIG. 6b*

| LIST 610 | CLUSTER 1 620 |
|---|---|
| 604->(Z,W) 605->(X,Y) 606->(X,W) 607->(Y,W) | 600->(C,D) 601->(A,D) 603->(B,D) 602->(A,B) |

*FIG. 6c*

| LIST 610 | CLUSTER 1 620 | CLUSTER 2 630 |
|---|---|---|
| 605->(X,Y) | 600->(C,D) | 604->(Z,W) |
| 606->(X,W) | 601->(A,D) | |
| 607->(Y,W) | 603->(B,D) | |
| | 602->(A,B) | |

FIG. 6d

| LIST 610 | CLUSTER 1 620 | CLUSTER 2 630 |
|---|---|---|
| 605->(X,Y) | 600->(C,D) | 604->(Z,W) |
| | 601->(A,D) | 606->(X,W) |
| | 603->(B,D) | 607->(Y,W) |
| | 602->(A,B) | |

FIG. 6e

| CLUSTER 1 620 | CLUSTER 2 630 |
|---|---|
| 600->(C,D) | 604->(Z,W) |
| 601->(A,D) | 606->(X,W) |
| 603->(B,D) | 607->(Y,W) |
| 602->(A,B) | 605->(X,Y) |

FIG. 6f

METHOD AND APPARATUS FOR FINDING RELATED COLLECTIONS OF LINKED DOCUMENTS USING CO-CITATION ANALYSIS

RELATED APPLICATIONS

This Application is a Continuation in Part of U.S. Patent Application Serial No. 09/044,693 filed Mar. 18, 1998 now U.S. Pat. No. 6,038,574 entitled "Method and Apparatus For Clustering A Collection of Linked Documents Using Co-Citation Analysis".

FIELD OF THE INVENTION

The present invention is related to the field of analysis of linked collections of documents, and in particular to the clustering of collections of linked documents, e.g. World Wide Web Sites, to identify collections having similar content.

BACKGROUND OF THE INVENTION

The ever-increasing universe of electronic information, for example as found on the World Wide Web (herein after referred to as the Web), competes for the effectively fixed and limited attention of people. Both consumers and producers of information want to understand what kinds of information are available, how desirable it is, and how its content and use change through time.

Making sense of very large collections of linked documents and foraging for information in such environments. is difficult without specialized aids. Collections of linked documents are often connected together using hypertext links. The basic structure of linked hypertext is designed to promote the process of browsing from one document to another along hypertext links, which is unfortunately very slow and inefficient when hypertext collections become very large and heterogeneous. Two sorts of aids have evolved in such situations. The first are structures or tools that abstract and cluster information in some form of classification system. Examples of such would be library card catalogs and the Yahoo! Web site (URL: http://www.yahoo.com). The second are systems that attempt to predict the information relevant to a users needs and to order the presentation of information accordingly. Examples would include search engines such as Lycos (URL: http://www.lycos.com), which take a user's specifications of an information need, in the form of words and phrases, and return ranked lists of documents that are predicted to be relevant to the user's need.

Another system which provides aids in searching for information on the Web is the "Recommend" feature provided on the Alexa Internet Web site (URL: http://www.alexa.com). The "Recommend" feature provides a list of related Web pages that a user may want to retrieve and view based on the Web page that they are currently viewing.

It has been determined that one way to facilitate information seeking is through automatic categorization of Web Pages. One technique for categorization of Web pages is described by P. Pirolli, J. Pitkow and R. Rao in the publication entitled *Silk from a Sow's Ear: Extracting Usable Structures from the Web*, Conference on Human Factors in Computing Systems (CHI 96), Vancouver British Columbia, Canada, April 1996. Described therein is a categorization technique wherein each Web page is represented as a feature vector, with features extracted from information about text-content similarity, hypertext connections, and usage patterns. Web pages belonging to the same category, may then be clustered together. Categorization is computed based on inter-document similarities among these feature vectors.

Another aid for making sense of such collections is clustering. One way to approach the automatic clustering of linked documents is to adapt the existing approaches of clustering standard text documents. Such an approach is described by Cutting et al., in the publication entitled "Scatter/gather: A cluster based approach to browsing large document Collections", The 15th Annual International ACM SIGIR Conference on Research and Development in Information Retrieval, pages 318–329, August 1992. However, there are several impracticalities with such existing text-clustering techniques. Text-based clustering typically involves computing inter-document similarities based on content-word frequency statistics. Not only is this often expensive, but, more importantly, its effectiveness was developed and tuned on human-readable texts. It appears, though, that the proportion of human-readable source files for Web pages is decreasing with the infusion of dynamic and programmed pages.

Another option for performing clustering of document collections is to look at usage patterns. Unfortunately, any clustering based on usage patterns requires access to data that is not usually recorded in any easily accessible format. In the case of the Web, while a moderate amount of usage information is recorded for each requested document at a particular Web site, the log files for other sites are not publicly accessible. Thus while the usage for a particular. site can be ascertained, this information is not available for the other 500,000 Web sites that currently exist.

Other attempts at clustering hypertext typically utilize the hypertext link topology of the collection. Such techniques are described by R. A. Botafogo, E. Rivlin, and B. Schneiderman, *Structural Analysis of Hypertexts: Identifying Hierarchies And Useful Metrics*, ACM Transactions on Information Systems, 10(2):142–180, 1992. Such a basis for clustering makes intuitive sense since the links of a particular document represent what the author felt was of interest to the reader of the document. These known clustering methods have been applied to collections with several hundred elements, and do not seem particularly suited to scale gracefully to large heterogeneous collections like the Web, where it has been estimated that there are over 70 million text-based documents which currently exist.

While clustering or categorizing at the document level is important, it is also desirable to be able to cluster at the collection or web site level. Search engines such as Yahoo® can return results to queries separated into categories, web sites and web pages. While this may provide a categorization of sorts relative to the search terms, it does not take into account any relationships that the sites themselves may define. For example, a response to a query may return sites A and B. Suppose site A contains links to site X and Site B contains a link to site Y. The set generated as a result of the query does not indicate the relationships between sites A and X or sites B and Y. This is important because of the inconsistent use of terms as meta-data for the sites could result in some relevant sites being missed.

Other publications relevant to the invention of the present application:

Larson, Ray R., *Bibliometrics of the World Wide Web: An Exploratory Analysis of the Intellectual Structure of Cyberspace*, Proceedings of 59th ASIS Annual Meeting held in Baltimore Md., edited by Steve Hardin, Vol. 33:71—78, Information Today Inc., 1996.

SUMMARY OF THE INVENTION

A method and apparatus for identifying collections of linked documents is disclosed. In the method the links from a set of related documents are analyzed to identify a plurality of document collections. By analyzing only the link structure, a process intensive content analysis of the documents is avoided. A citation analysis technique, such as co-citation analysis, is performed on the set of documents to extract link information indicating links and link frequency between document collections. For co-citation analysis that information would include the frequency that both are linked to by another document collection. By using the link information, related document collections may then be identified using a suitable analysis technique, such as clustering or spreading activation.

The method of the present invention is preferably practiced on the documents and document collections found on the World Wide Web (web sites) and utilizes a form of citation analysis known as co-citation analysis. The method is generally comprised of the steps of: obtaining a list of web pages having some predetermined relationship; extracting a set of web sites from said list of web pages; creating a co-citation list, said co-citation list comprised of pairs of web sites that are linked to by the same web site and the frequency or number of occurrences of links from the same web site; and performing a suitable operation utilizing said co-citation list, such as clustering or spreading activation, to find related web sites.

BRIEF DESCRIPTION OF THE DRAWINGS

FIGS. 6a–6f is a diagrammatic representation of the list of co-cited pairs generated from FIG. 5 and are used for the purpose of describing an example of the "all-pairs" method of clustering web pages in the currently preferred embodiment of the present invention.

DETAILED DESCRIPTION OF THE INVENTION

A system for analyzing a retrieved set of linked documents for the purpose of finding closely related document collections (e.g. web sites) is disclosed. The information derived from such a system may be used to aid a user in finding desired information or be fed into other computations useful in analysis of collections of linked documents (e.g. spreading activation), or in creating visualizations of the collections.

The currently preferred embodiment of the present invention is implemented for analyzing collections of linked documents (i.e. Web Pages) residing on the portion of the Internet known as the World Wide Web (hereinafter the Web). The Web is the portion of the Internet that is used to store and access linked documents. A Web page may have multi-media content as well as relative and absolute links to other pages. A Web Site is a collection of related Web pages associated with an entity having a presence on the World Wide Web such as a company, educational institute or the like.

In this description, the term Web page is an instance of a linked document and the two terms may be used interchangeably. Moreover, it should be noted that the present invention is not limited to use on the Web and may be utilized in any system which provides access to linked entities, including documents, images, videos, audio, etc.

It has been observed that a collection of Web pages has a topology that is defined by links contained in the individual Web pages. Links are an indicator on a Web page which refers to another Web page and which can typically be retrieved in a point and click fashion. The link will specify the address, i.e. Uniform Resource Locator or URL, of the other Web page.

Figure 1:
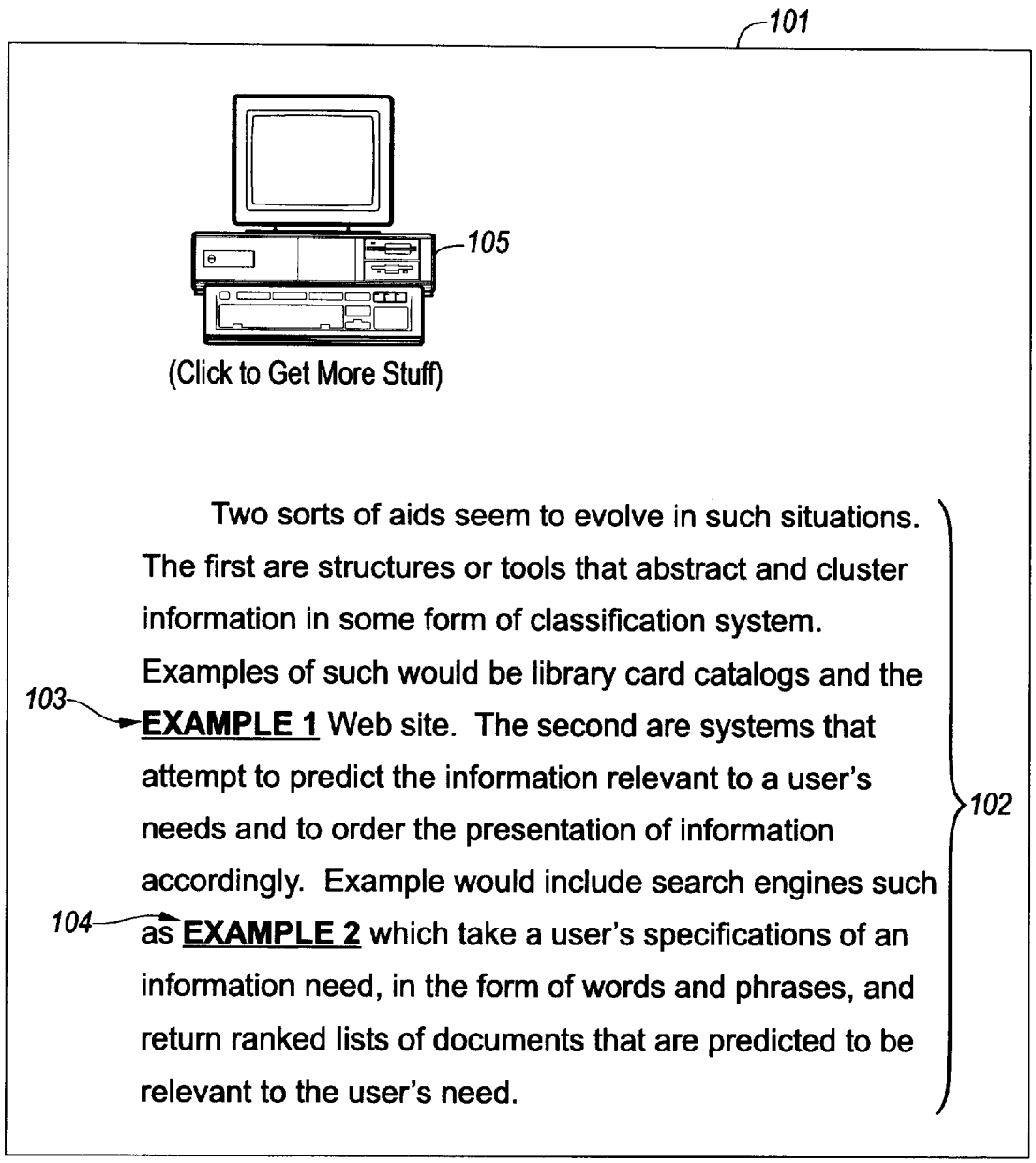
FIG. 1 is a block diagram illustrating the underlying structure of a Web Page.
Figure 2:
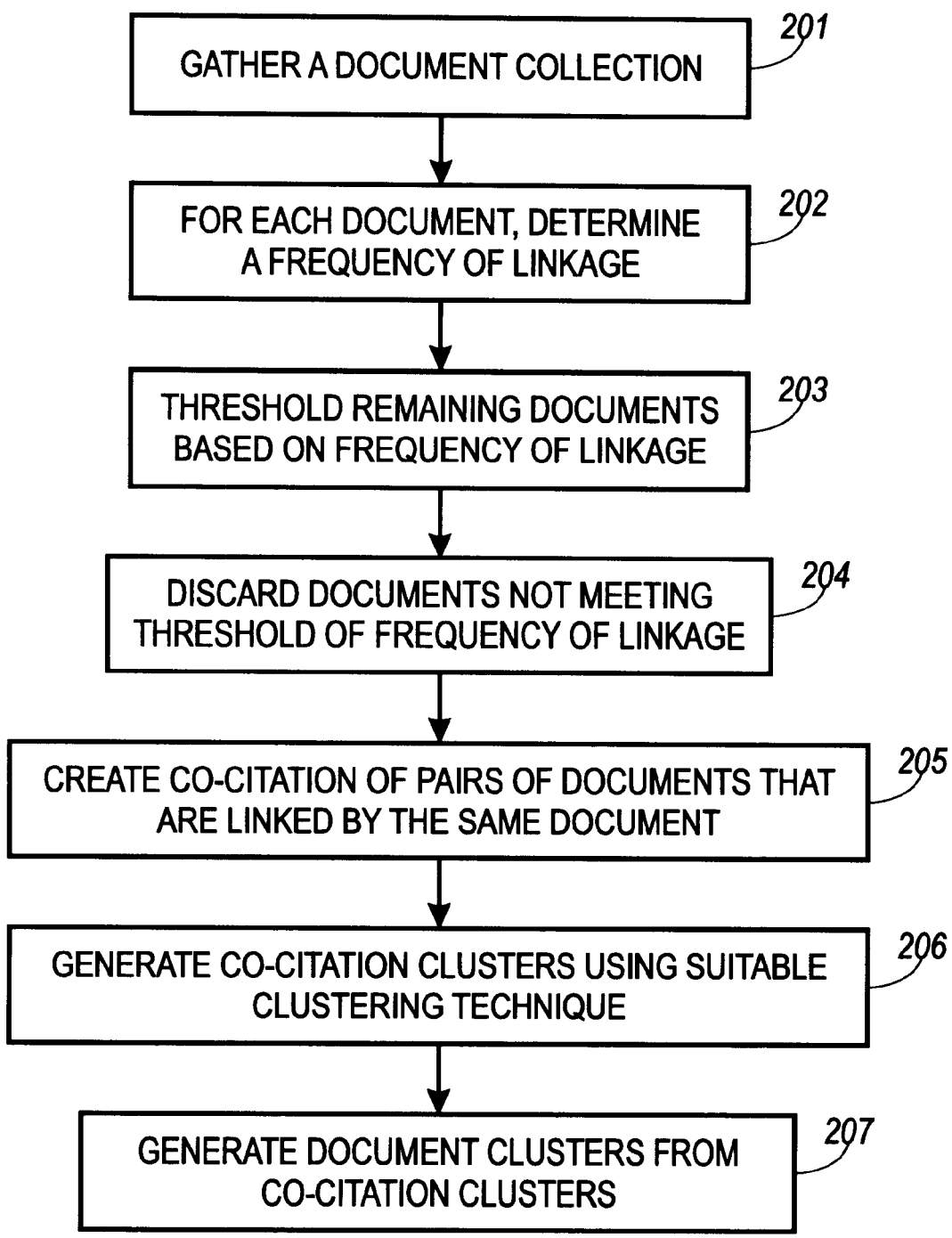
FIG. 2 is a flowchart illustrating the basic steps for the co-citation analysis and resulting clustering as may be performed in the currently preferred embodiment of the present invention.

FIG. 1 is a block diagram illustrating the underlying structure of a Web page. As would be known by one of ordinary skill in the art, such a Web page would be typically specified in a mark-up language such as the Hyper-text MarkUp Language (HTML) or the Extensible Mark-Up Language (XML) and which would be viewable via a Web Browser. A Web Browser is a tool which enables a user to traverse through and view documents residing on the Web. Other rendering means associated with the Browser will permit listening to audio portions of a document or viewing video or image portions of a document. Examples of commercially available Web Browsers include Netscape Navigator™, available from Netscape Communications Corporation, and Internet Explorer™, available from the Microsoft Corporation.

In any event, the Web Page 101 has text content part 102 and links 103-105. The text content part 102 is merely the standard text of a document. The links 103-105 may be represented on a rendered page as either text (e.g. links 103-104) or image (e.g. link 105). As illustrated in FIG. 1, when the link is represented as text, it is visually distinct from ordinary text. In FIG. 1 the links 103 and 104 are underlined.

Making sense of the millions of web pages available on the Web is a daunting and difficult task. As a way of circumventing these difficulties, in the currently preferred embodiment of the present invention, co-citation analysis has been utilized as a way to cluster groups of web pages.

The adaptation of this clustering technique is based solely on the analysis of hypertext link topology of a collection of Web pages. Unlike earlier link-topology techniques, co-citation analysis builds upon the notion that when a Web page D contains links referring to documents A and B, then A and B are related in some manner in the mind of the person who produced the document. In this example, documents A and B are said to be co-cited. It is important to note that links between document A and document B may or may not exist. Given this property of picking up patterns from the implicit topological structure of hypertext documents, it has been determined that co-citation analysis is useful in telling us something about the semantic structure of a collection and the thinking of the authoring community.

Overview of Co-Citation Analysis

Citation indexing, the creation of an index that details the explicit linkages of citations between papers, has been employed as a tool to facilitate the searching and the management of information for over a century, dating back to the legal profession's use of the Shepard's Citations in 1873. The field underwent major advances during the post World War II increase in scientific expenditures and subsequent explosive increase in the scientific literature. With the intent of ensuring information exchange among scientists, the United States government initiated a number of projects to generate indexes without human involvement. Citation indexing was found to be a powerful yet simple tool, as it replaces an indexer's subjective judgements with author's citations, thus avoiding many of the semantic problems found in term and title based analyses. See the publication E. Garfield. Citation Indexing. ISI Press, Philadelphia, Pa., 1979 for more information.

It was not until the mid-1970s however that Small and Griffith described a co-citation analysis as a method for measuring the common intellectual interest between a pair of documents. See H. Small and B. Griffith. *The structure of scientific literatures, Identifying and graphing specialties, Science Studies,* 4(17):17–40, 1974. The principal component of co-citation analysis measures the number of documents that have cited a given pair of documents together. This metric is referred to as co-citation strength. Unlike other forms of citation analysis, co-citation strength is able to reflect the frequency of items being cited over time, thus enabling deeper insight into the development of certain research fields and other semantic structures within a citation index. Similarly, it has been determined that co-citation analysis yields insight into the implicit semantic structures of the Web.

The original method developed by Small and Griffith takes a citation index as initial input. Recall that a citation index is an index that details the explicit linkages of citations between papers. For all documents in the index, the number of times a document was cited is computed and those documents whose cited frequency falls above a specific threshold are kept for further processing. This prefiltering retains the most important (or at least the most popular) documents. Next, the extracted documents are sorted and all pairs of documents that have been cited together by the same source document are formed. The resulting list contains unique co-citation pairs and their associated frequency of co-occurrence.

The final step in co-citation analysis creates a set of clusters whose elements are indirectly or directly related by co-citation. This is accomplished by clustering all documents that have at least one document of the co-citation pair in common with the other elements in the cluster. To start, a pair is selected, say AB, and all pairs that contain A or B are added to the cluster. Next, all pairs that include a document that have been included in the cluster are added. This processes repeats until there are no pairs that have a document in common with the elements in the cluster. At this point, a new pair is selected from the remaining pairs to form a new cluster and the processes repeated until all pairs belong to a cluster. This clustering technique is referred to herein as the All-Pairs method.

Bibliograhic Coupling

Another well known technique for citation analysis is bibliographic coupling, e.g. see the text "INTRODUCTION TO INFORMETRICS Quantitative Methods in Library, Documentation and Information Science" by Leo Egge and Ronald Rousseau, Elsevier Science Publishers (1990). Bibliographic coupling is the inverse transformation of co-citation analysis. In bibliographic coupling, a document collection is analyzed to create document pairs and an indicator of the number of common documents that they both cite. Since bibliographic coupling is merelythe inverse transformation of a co-citation matrix, the resulting analysis techniques described herein with respect to co-citation matrix, other than how to generate a co-citation matrix, would apply equally to bibliographic coupling.

Bibliographic coupling has features that distinguish it from co-citation analysis. First, bibliographic coupling is more time invariant than co-citation analysis, i.e. once two documents are coupled, the coupling strength never changes until one of the document's hyperlink structure changes. The exact opposite occurs with co-citation analysis, since the co-citation/hyperlink strength of a pair of documents depends upon the number of documents that reference it, which changes as more documents are created that reference the pair. Thus, a bibliographic coupling analysis can be computed less frequently than a co-citation analysis. As applied to the Web, bibliographic coupling also reflects the state of field/area at the time the documents were created, providing interesting insights into the evolution of Web pages and ideas and Web sites.

Figure 7:
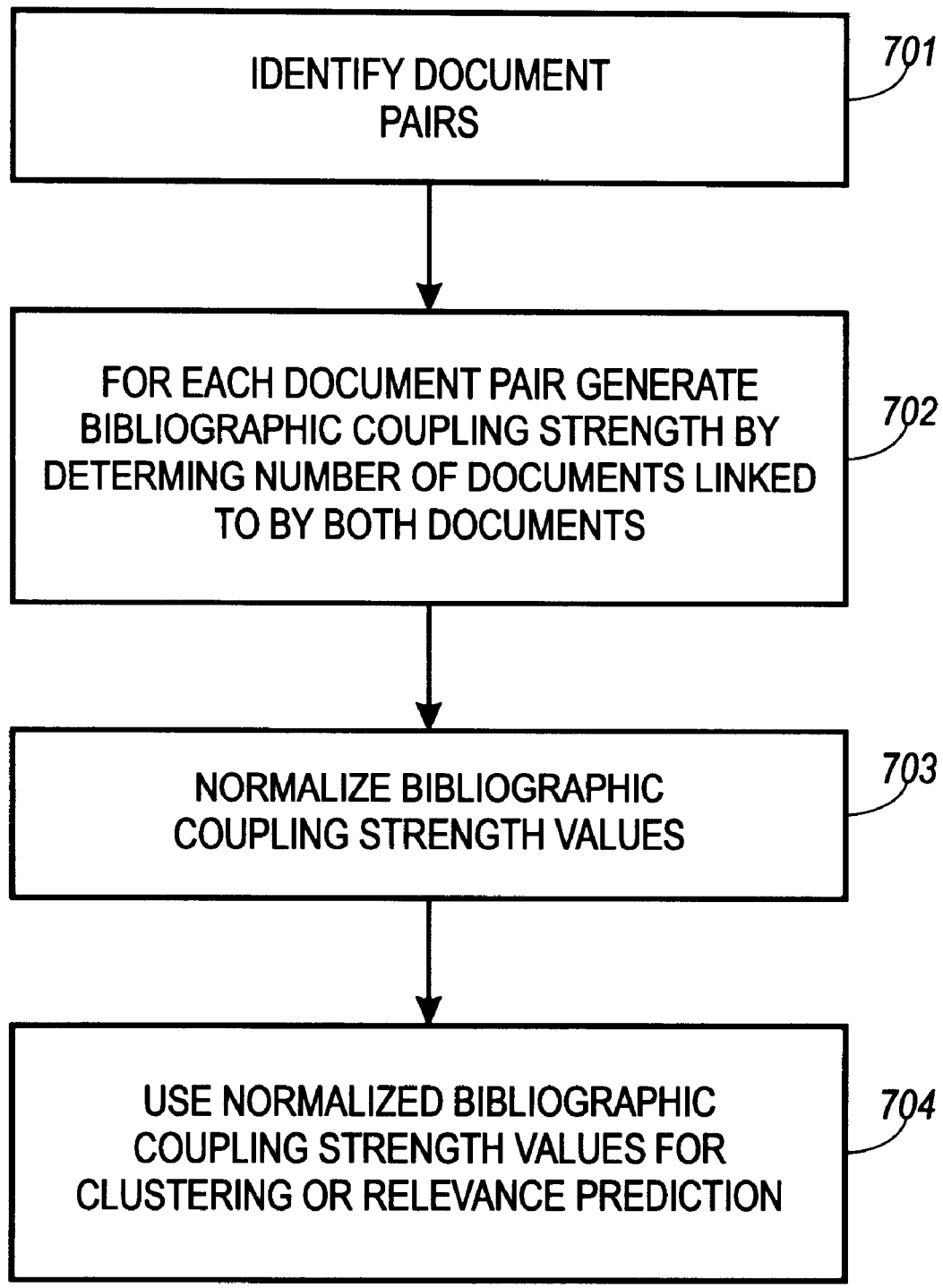
FIG. 7 is a flowchart illustrating the steps for creating a matrix indicating the bibliographic coupling amongst documents in a collection of linked documents as may be performed in the currently performed embodiment.

An exemplary process of bibliographic coupling on a set of documents is described with reference to the flowchart of FIG. 7. Referring to FIG. 7, first document pairs are identified from the set, step 701. For each document pair, the number of documents which each are linked to by both documents is determined, step 702. The number of documents is an indication of the "strength" of the bibliographic coupling. This is accomplished by generating a link index for each document and then comparing the index for each document. Recall that a link index is merely a list of links contained in a document. For web pages, links are identified by specific "tags" placed before them in mark-up language such as HTML (HyperText Mark-up Language) or XML (eXtensible Mark-up Language). Next, the strength values are normalized, step 703. This normalization takes in account the variations in the lengths of the reference lists for each document (i.e. the number of links to other documents). Finally, the strength values can be used as input for subsequent analysis, such clustering or relevance prediction, step 704. Such clustering and relevance prediction techniques described with respect to usage of co-citation lists would apply equally to bibliographic coupling strength information, perhaps with slight modifications. For example, in the aforementioned All-Pairs method of clustering, the clustering could be premised on each of the document pairs added to a cluster having a particular bibliographic coupling strength.

Application to the Web

It has been observed that the properties that fueled the development of citation and co-citation analysis are similar to those found between documents on the Web. The links found in Web pages, when employed in a non-random format, provide semantic linkages between objects, much in the same manner that citations link documents to other related documents. The resulting topology of a Web site reflects the organization of a community and its knowledge base, similar to the way in which citations in a scholarly paper reflect a scientific community's organization of knowledge.

It could be argued that links often serve as just navigational aids. This may be true for example for many of the links found on a "home page" for a particular Web locality. However, the role of hyperlinks for navigation may still be viewed as a hypothesis by the hypertext author(s) that the person interested in the current page will also be interested in browsing the linked pages. It has been determined that given the close resemblance of hyperlinks to citations, meaningful structures would emerge as the result of co-citation analysis on Web site.

An example of application of co-citation analysis as applied to the Web is found in a publication by Larson, Ray R., *Bibliometrics of the World Wide Web: An Exploratory Analysis of the Intellectual Structure of Cyberspace*, Proceedings of $59^{th}$ ASIS Annual Meeting held in Baltimore Md., Vol. 33:71–78, Information Today Inc., 1996. In the publication Larson uses co-citation analysis to examine the "bibliometrics" of the Web so as to map its contents.

Generally speaking, the clustering of Web pages is useful in that it aids in the sense-making of large document collections, i.e. understanding its content and the relationship amongst the various documents. Further, clustering may be used as a real time aid in searching document collections using scatter-gather techniques. The clustering of the present invention may be used in any of these settings.

Method For Clustering Web Pages

The currently preferred embodiment of the present invention is implemented using software programs which inspect the mark-up language (e.g. HTML) representations of the documents. As would be known by one of ordinary skill in the art, links are identified by specific "tags" placed before them as defined by the mark-up language. Identification of links is thus accomplished by looking for the specific tags. In any event, the first step is to gather a document collection, step 201. This may be done by a specific query to the Web, using a document retrieval system such as Lycos™, Excite™, etc. or using a Web walker which automatically follows the links on a document and collects the linked documents. Or, the document collection could be some randomly selected collection of documents. Or the document collection could be a particular Web site or set of Web sites or even the entire Web itself. Next, for each document, determine the frequency of linkage, i.e. the number of times it is linked to by another document in the collection, step 202. This may be accomplished by maintaining a table data structure having a document identifier field and link count field which is updated upon occurrence of a link to that document. This is done to get a relative sense of the "relatedness" of a document in the context of the particular document collection. Next, the documents are thresholded based on some specified minimum frequency of linkage, step 203 and the unused documents are discarded, step 204. This is essentially done as a matter of computational efficiency as documents below some minimum threshold are deemed "unrelated" to the other documents in the document collection. It should be noted that this threshold value should be established so as not to preclude relevant "young" documents that may not have many links to it at the time of analysis. A good threshold value yields the right number of clusters at the right size. It has been determined that a threshold value that is set too high causes a few clusters with a large number of documents and with many clusters with a small number of documents. If the threshold value is set too low, the result is fewer clusters with fewer documents in each. Note that preferably the threshold value can be changed by a user until the desired cluster characteristics are achieved.

Next, a co-citation list of pairs of documents that are linked to by the same document is created, step 205. Each of the pairs of documents will also have a count of the number of times (the co-citation frequency) that they were both linked to by another document. The co-citation list may typically be generated and comprised of a table data structure having a first field identifying a co-citation pair and a second field having a count of the number of times that the co-citation pair were linked to by the same document.

A suitable clustering operation is then performed on the co-citation list to generate co-citation clusters, step 206. Such suitable clustering operations are described in more detail below. The individual documents are then identified from the co-citation clusters and provided as a document cluster, step 207. This is performed since each document is typically referenced in multiple of the co-citation pairs.

A first type of clustering utilizes a technique known as transitive closure. Transitive closure is generally related to identification of self-contained sets of node link structures, i.e. no node (document) has a link to another node (document) outside of the set. The clustering techniques using transitive closure can be generally described as follows:

Given S=the set of all documents; V=the links contained in each document; G=<S,V>=the graph of nodes S and links V Step 1: Let Result={ }
Step 2: Pick a node i in S
Step 3: Find the transitive closure of i in G –>C(i)
Step 4: Reset S<–S-C(i) and Add C(I) to Result Set
Step 5: Loop Steps 2–4 until S={ }
Step 6: Return Result Set The step 3 may be accomplished using a transitive closure technique such as the well known Floyd-Warshall technique.

Figure 3:
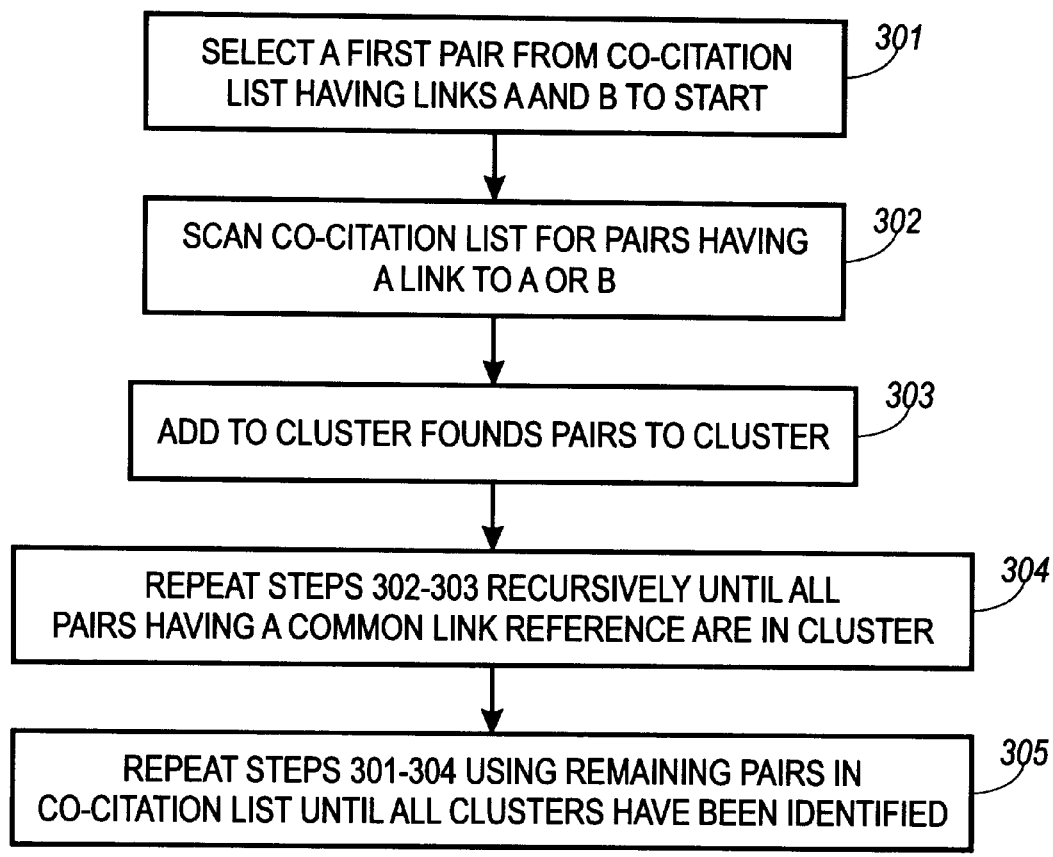
FIG. 3 is a flowchart illustrating the steps for performing an "all pair" clustering of a list of co-cited Web pages as may be performed in the currently preferred embodiment of the present invention.

A transitive closure clustering method, referred to as the all-pairs method is described with reference to the flowchart of FIG. 3. The objective of the all-pairs method is to place in a cluster all pairs having at least one common link. Referring to FIG. 3, a first pair having a first page link reference (A) and a second page link reference (B) is selected, step 301. This represents a first cluster. Next, the list is scanned to find all pairs having a link reference to A or a link reference to B, step 302. Each of the pairs so identified is then identified as being in the first cluster, step 303. The steps 302–303 are repeated recursively for each of the co-citation pairs in the cluster until all pairs having a common link reference are included in the first cluster, step 304. The steps 301–304 are then repeated using the remaining pairs of the original co-citation list until all clusters have been identified, step 305. The "all-pairs" method of clustering is described in greater detail below with respect to FIG. 6.

Figure 4:
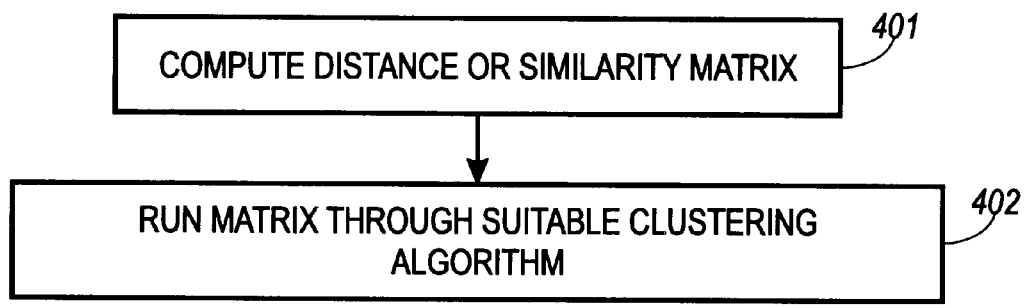
FIG. 4 is a flowchart illustrating the steps for performing a statistical clustering of a list of co-cited Web pages as may be performed in the currently preferred embodiment of the present invention.

An alternative technique may use some form of statistical clustering. Such statistical clustering is generally described in the flowchart of FIG. 4. Referring to FIG. 4, first a distance or similarity matrix is computed, step 401. In the currently preferred embodiment, the Euclidean distance matrix on the log transformed co-citation frequencies is computed. However, other known methods that may be utilized include Manhattan, maximum, and binary distance metrics. One may also compute the correlation coefficients for each cell. In any event, the matrix is run through a suitable clustering algorithm, step 402. In the currently preferred embodiment, the Euclidean distance matrix is run through complete linkage clustering method to obtain clustering. However, other forms of clustering may be utilized.

It should be noted that clustering techniques usually fall into one of two categories: hierarchical techniques (in particular agglomerative and divisive) and partitioning techniques. Agglomerative methods start with each element in a single cluster and successively merges the closest pairs. Common forms of this are Ward's clustering and hierarchical clustering. Divisive methods start with all the elements as one cluster and splits until each element is in a separate cluster. Two common form of this are diana and mona. Partitioning methods divide the elements into a pre-defined number of clusters. A common form of this is called k-means. For a description of other suitable clustering techniques see the text entitled Finding Groups in Data An Introduction to Cluster Analysis, Leonard Kaufman, Peter J. Rousseeuw, published by John Wiley & Sons, New York, 1990.

Figure 5:
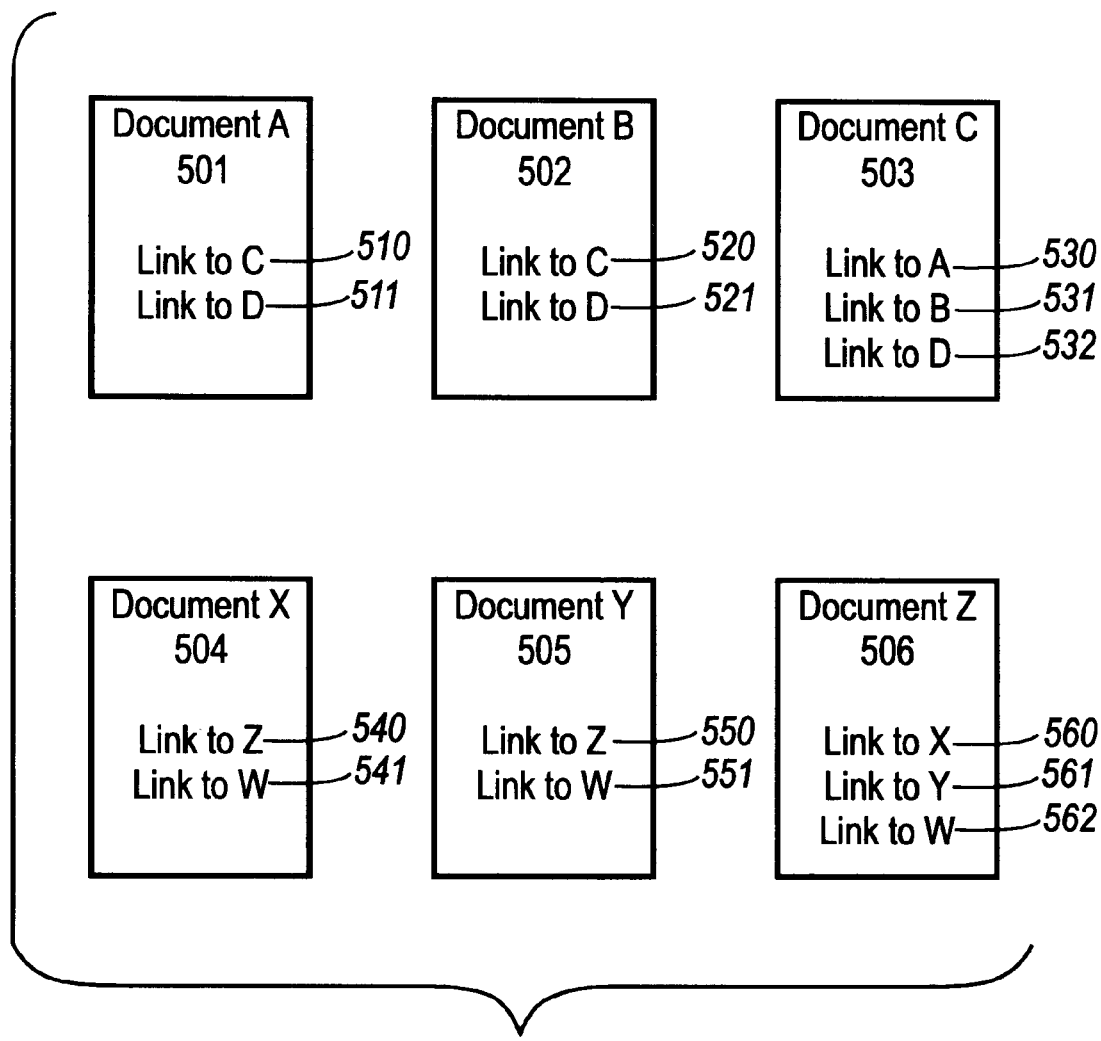
FIG. 5 is a diagrammatic representation of a plurality of documents and their links used for the purpose of describing an example of the co-citation analysis of the currently preferred embodiment of the present invention.

Example of the Co-citation Analysis and Clustering of the Currently Preferred Embodiment What follows is an example that illustrates the co-citation analysis of the present invention. It is assumed that each of the documents has met the threshold requirement of being "linked" to a minimum number of times. FIG. 5 illustrates a plurality of documents 501–506 having defined links. As illustrated document A 501 has links 510–511, document B 502 has links 520–521, document C 503 has links 530–532, the document X 504 has links 540–541, document Y 505. has links 550–551 and document Z 506 has links 560–562. It can then be seen that the co-citation pairs from the respective documents are:

document A 501: (C,D)
document B 502: (C,D)
document C 503: (A,B), (A,D), (B,D)
document X 504: (Z,W)
document Y F 505: (Z,W)
document Z 506: (X,Y), (X,W), (Y,W)

The co-citation list and associated frequency then becomes:
(C,D):2, (A,D):1, (A,B):1, (B,D):1, (Z,W):2, (X,Y):1, (X,W):1, (Y,W):1

FIGS. 6a–6f illustrates use of the "all-pairs" method for clustering the co-citation list. Note that the co-citation method does not utilize the frequency of the co-citation. That is typically used in statistical clustering techniques. Referring to FIG. 6a, a list 610 and cluster 1 620 are illustrated. The elements 601–607 in the list 610 are the elements in the co-citation list generated with respect to the example of FIG. 5, except for the list pair 600 which is used as the randomly selected initial pairing for cluster 1 620.

Referring to FIG. 6b, added to cluster 1 620 are the co-citation pairs from the list which have either a C or D in them. So as illustrated the pairs 601 and 603 have been added to cluster 1 and removed from the list 610.

Referring now to FIG. 6c, as a result of the addition of co-citation pair 601 to cluster 1, any co-citation pair having an A is added to the cluster. This results in the co-citation pair 600 being added to cluster 1 620. Note that as a result of the addition to cluster 1 of co-citation pair 603, the list would be inspected for any pair having a B. But since no pair in the list 610 contains a B, illustration of such a step has been omitted.

Referring now to FIG. 6d, a cluster 2 630 is now being formed. This is illustrated by addition of pair 604 to cluster 2 630. Referring now to FIG. 6e, the pairs 606 and 607 have been added to cluster 2 630 as a result of the each having a link to W. Finally, referring to FIG. 6f, the pair 605 is added to the cluster 2 630 as a result of having a link to Y.

Clustering of Document Collections

Figure 8:
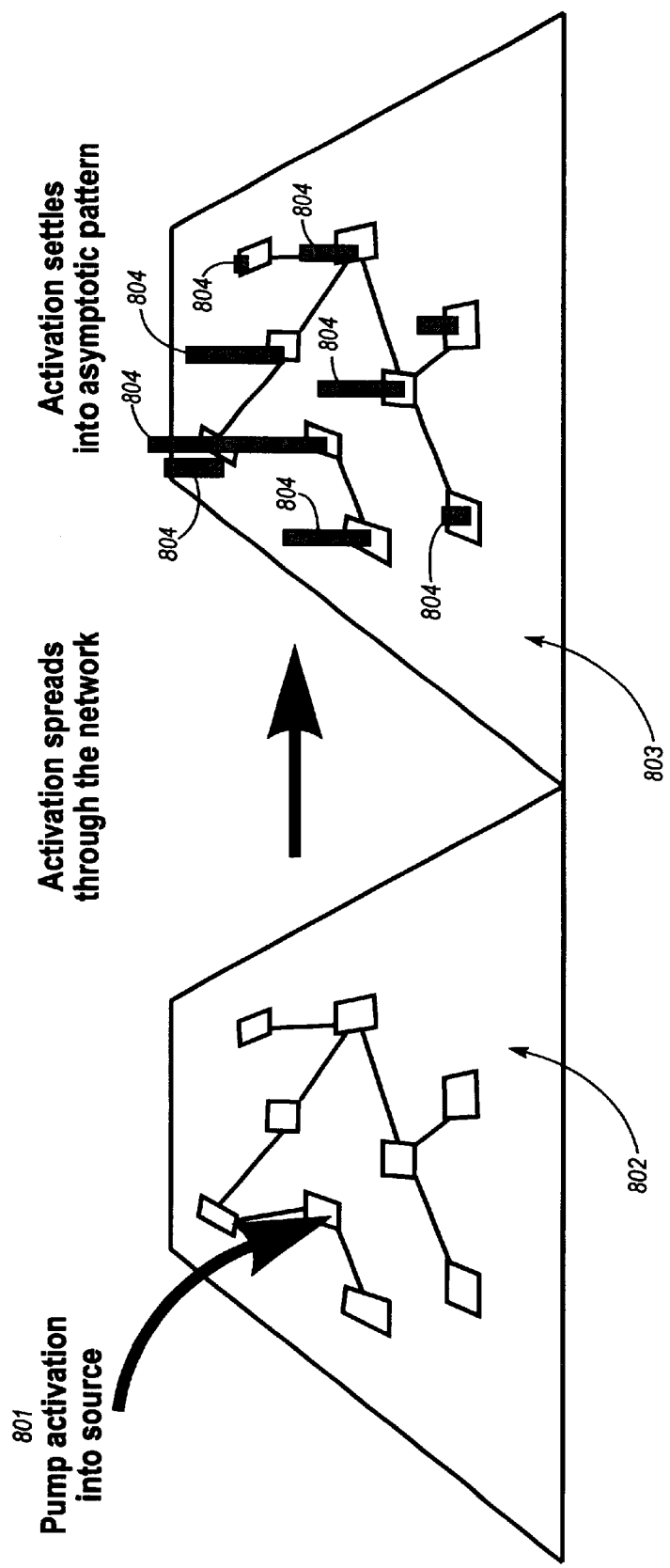
FIG. 8 is a flowchart illustrating the steps for performing a co-citation analysis to obtain sets of co-citation pairs in order to find related collections of linked documents in the currently preferred embodiment of the present invention.

As described above, the techniques of the present application may also be used to cluster web sites. The flowchart of FIG. 8 illustrates how this may be accomplished. First, a collection of web pages is obtained, step 801. This collection may be gathered based on a sampling of web pages, through a "web crawl" where linked pages are obtained, or through a query to one or more search engines. In any event, the collection of web pages will be related in some manner. Next, web sites (document collections) are identified based on the web pages, step 802. Web sites are identified based on the Universal Resource Locator (URL) address of a web page. For example, a web page having the URL "www.companyabc.com/samplepage" is found at the web site "www.companyabc.com". At the end of step 802, a list of web sites along with indicators of the corresponding web page(s) is thus obtained.

It is anticipated that the number of web sites may include many "unrelated" sites. Thus, an optional efficient means to reduce the number web sites is provided. First, site frequencies by "in-links" are computed, step 803. What this means is that for each identified site the number of links into the site from each of the other sites in the list of web sites is obtained. The manner in which this is done is described in greater detail below. It is also noteworthy that this process of computing "in-links" may also result in the identification of "new" web sites. Pages in such "new" sites would be linked to by pages in the original collection of web pages. In order to reduce the number of sites to be considered. the sites are ranked based on "in-link frequency", step 804. Alternatively, other means for ranking could be used such as site usage (e.g. the number of times a site is accessed). A subset of the sites are thus identified by the ranking for further processing, step 805. This may be accomplished for example by establishing some threshold value or by selecting the top "n" sites based on the ranking criteria.

Co-citation pairs and their corresponding frequency are determined for the remaining set of sites, step 806. The co-citation pairs are defined as pairs of web sites that are both linked to by the same web site. This can be accomplished by constructing and analyzing a citation index for each web page. As noted above, a citation index is merely a listing of all the links contained in the page. For each pair of web sites, analysis of the citation index for each page would reveal the number of times each of the sites are both cited by the same page and thus the same site.

Once the co-citation pairs are obtained, analysis using the co-citation pair information to identify collections of related web sites is performed, step 807. The actual analysis technique used may vary, but would include clustering or spreading activation.

Figure 9:
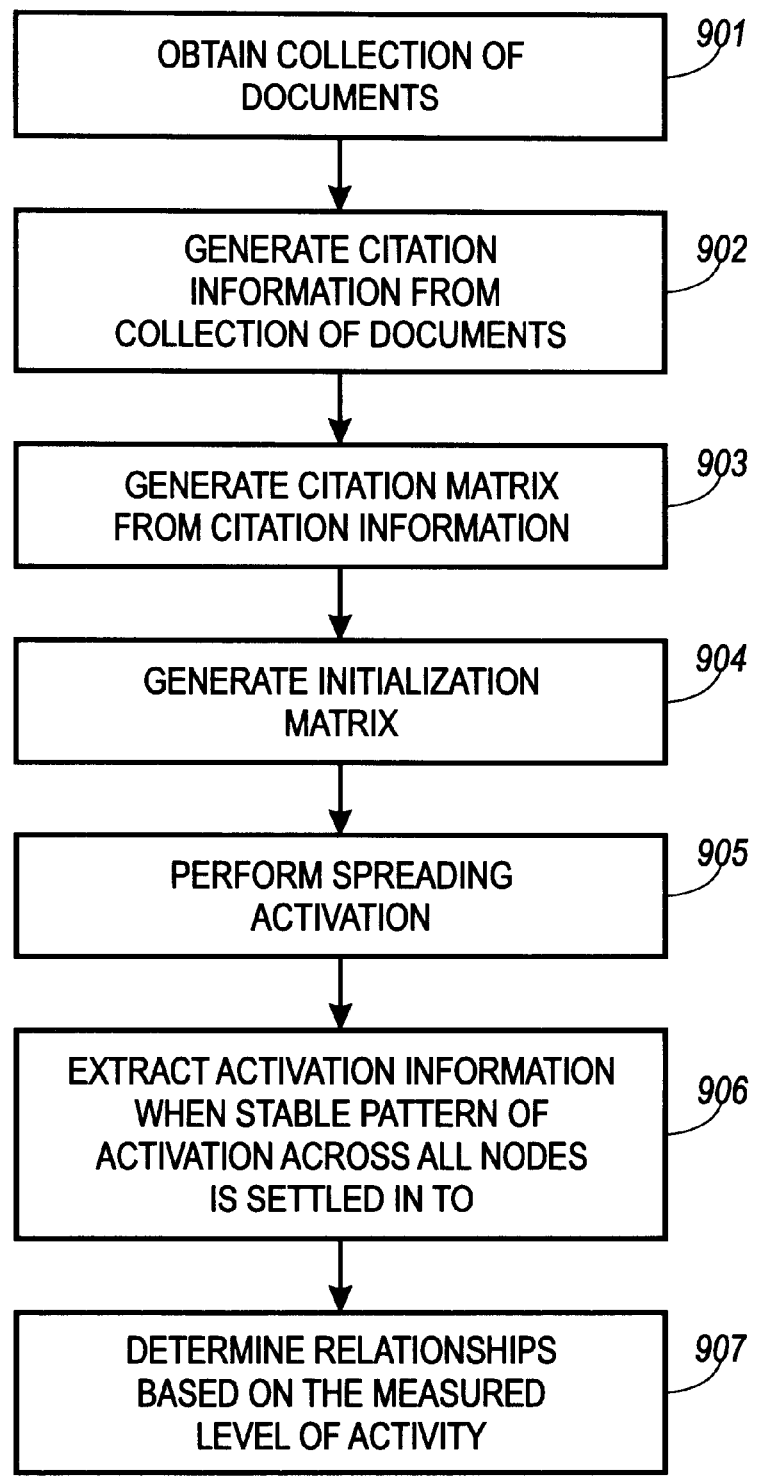
FIG. 9 is a block representation of a data structure for supporting the step of finding citation frequencies for collections as performed in the currently preferred embodiment of the present invention.

The manner in which in-link frequencies are determined in step 807 may be performed in combination with the web site identification step 802. A data structure for supporting this step is described with reference to FIG. 9. Referring to FIG. 9, fields for an identifier for a source site 901, an identifier for a destination site 902 and a frequency value 903 are provided. Each will in turn be processed as a source site. For each source site the links found in the web pages from that site to destination sites are extracted and the "destination sites" identified. Note that a "destination site" need not have been in the original list of identified web sites. This occurs when the "destination site" had no pages included in the original collection of web pages. In any event, the frequency count information for a particular destination site is updated when a link to that site is encountered. As there may be multiple web pages associated with a particular "source" Web site, the frequency is the aggregate of all the links from the multiple web pages to the "destination" web site.

Described in another way, the in-link frequencies are determined generally using the methodology described below:

For each link in each web page:
    If link represents a new source destination pair, create structure of source/destination pair and set frequency count to 1;
    If link does not represent a new source destination pair, add 1 to frequency count of existing structure of source destination pair.

Visualizations of Document Clusters and Collections

Most current Web browsers provide very little support for helping people gain an overall assessment of the structure and content of large collections of Web pages. Information Visualization could be used to provide an interactive overview of web localities that facilitates navigation and general assessment. Visualizations have been developed that provide new interactive mechanisms for making sense of information sets with thousands of objects. The general approach is to map properties and relations of large collections of objects onto visual, interactive structures.

The document clustering of the present invention may be used to support such Information Visualization. To the extent that the properties that help users navigate around the space and remember locations or ones that support the unit tasks of the user's work, the visualizations provide value to the user. Visualizations can be applied to the Web by treating the pages of the Web as objects with properties. Each of these visualizations provide an overview of a Web site in terms of some simple property of the pages. For example, the clustering of web pages as may be performed in the present invention may be used to create new document collections for use by other information visualization techniques, such as the WebBook described in co-pending and commonly assigned application Ser. No. 08/525,936 entitled "Display System For Displaying Lists of Linked Documents", to form and present larger aggregates of related Web pages. Other examples include a Cone Tree which shows the connectivity structure between pages and a Perspective Wall which shows time-indexed accesses of the pages. The cone tree is described in U.S. Pat. No. 5,295,243 entitled "Display of Hierarchical Three-Dimensional Structures With Rotating Substructures". The Perspective Wall is described in U.S. Pat. No. 5,339,390 entitled "Operating A Processor To Display Stretched Continuation Of A Workspace".

Figure 10:
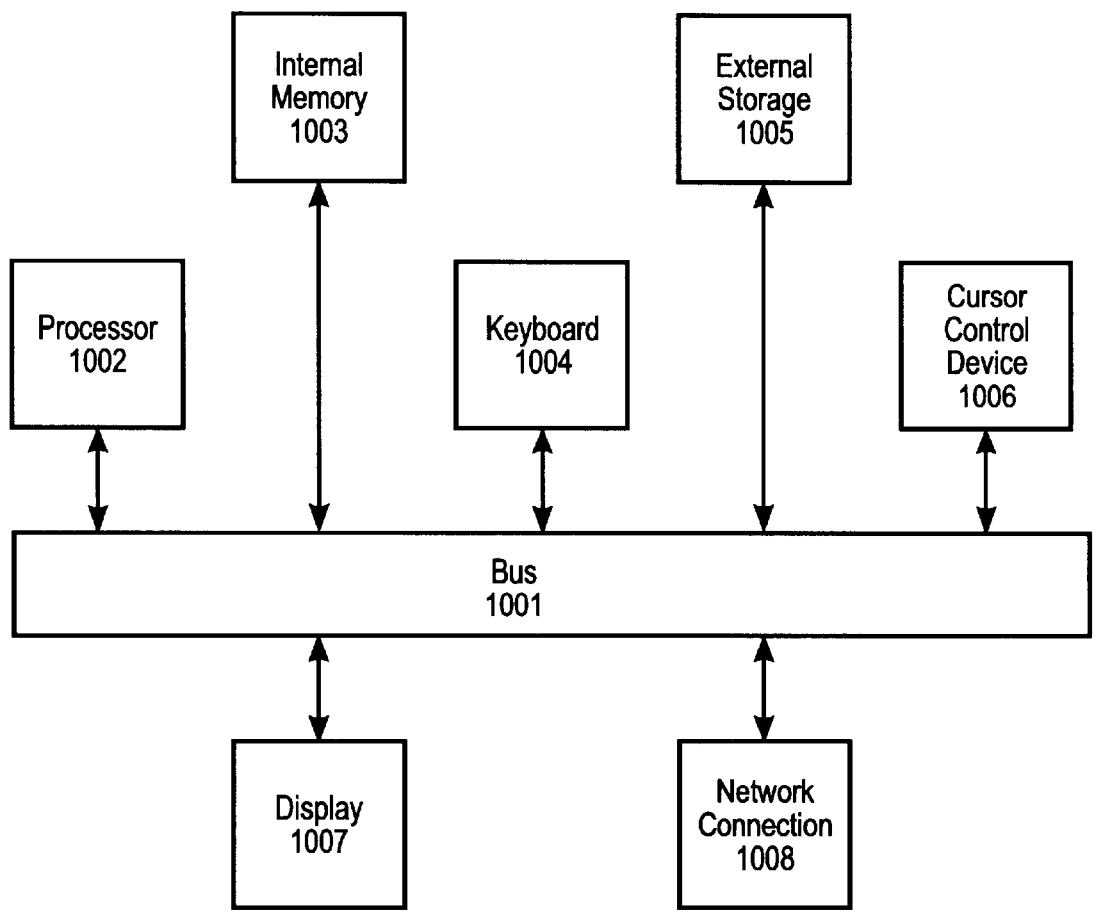
FIG. 10 is a block diagram of a computer based system upon which the currently preferred embodiment of the present invention may be implemented.

Overview of a Computer Controlled Display System In the Currently Preferred Embodiment of the Present Invention The computer based system on which the currently preferred embodiment of the present invention may be implemented is described with reference to FIG. 10. As noted above, the present invention is implemented using software programming instructions for execution on a computer based system. The computer based system and associated operating instructions (e.g. software) embody circuitry used to implement the present invention. Referring to FIG. 10, the computer based system is comprised of a plurality of components coupled via a bus 1001. The bus 1001 may consist of a plurality of parallel buses (e.g. address, data and status buses) as well as a hierarchy of buses (e.g. a processor bus, a local bus and an I/O bus). In any event, the computer system is further comprised of a processor 1002 for executing instructions provided via bus 1001 from Internal memory 1003 (note that the Internal memory 1003 is typically a combination of Random Access and Read Only Memories). The processor 1002 will be used to perform various operations in support extracting raw data from Web site, converting the raw data into the desired feature vectors and topology, usage path and text similarity matrices, categorization and spreading activation. Instructions for performing such operations are retrieved from Internal memory 1003. Such operations that would be performed by the processor 1002 would include the processing steps described in the flowcharts of FIGS. 2–4, 7 and 8 and the accompanying descriptions. The operations would typically be provided in the form of coded instructions in a suitable programming language using well-known programming techniques. The processor 1002 and Internal memory 1003 may be discrete components or a single integrated device such as an Application Specification Integrated Circuit (ASIC) chip.

Also coupled to the bus 1001 are a keyboard 1004 for entering alphanumeric input, external storage 1005 for storing data, a cursor control device 1006 for manipulating a cursor, a display 1007 for displaying visual output and a network connection 1008. The keyboard 1004 would typically be a standard QWERTY keyboard but may also be telephone like keypad. The external storage 1005 may be fixed or removable magnetic or optical disk drive. The cursor control device 1006, e.g. a mouse or trackball, will typically have a button or switch associated with it to which the performance of certain functions can be programmed. The network connection 1008 provides means for attaching to a network, e.g. a Local Area Network (LAN) card or modem card with appropriate software. The network ultimately attached to is the Internet, but it may be through proxy servers or intermediary networks or dial-up services such as America On-Line, Prodigy TM or CompuServe TM.

Thus, a method and system for analyzing a collection of linked documents for the purposes of identifying related document collections is disclosed. While the present invention is described with respect to a preferred embodiment, it would be apparent to one skilled in the art to practice the present invention with other configurations of digital document management and access systems. Such alternate embodiments would not cause departure from the spirit and scope of the present invention.

What is claimed is:

1. A method for identifying related collections of linked documents, said method comprising the steps of:

a) obtaining a list of documents having some predetermined relationship;

b) identifying a set of collections of linked documents from said list of documents;

c) creating a co-citation list, said co-citation list comprised of pairs of collections that are linked to by the same collection in said set of collections of linked documents; and d) performing a suitable clustering operation utilizing said co-citation list to generate collection clusters, each of said collection clusters indicating a relationship amongst collections in said cluster.

2. The method as recited in claim 1 wherein prior to said step of creating a co-citation list, performing the step of ranking said set of collections based on a predetermined criteria and removing from said set of collections those below a predetermined threshold.

3. The method as recited in claim 2 wherein said predetermined criteria is an in-link frequency criteria and said step of ranking said set of collections is further comprised of the step of determining citation frequencies for each of said collections of linked documents, said citation frequencies indicating the number of times a collection is linked to from another collection.

4. The method as recited in claim 1 wherein said step of obtaining a list of documents is further comprised of the step of performing a query to a search engine.

5. The method as recited in claim 1 wherein said step of obtaining alist of documents is further comprised of the step of performing a crawl to gather documents by traversing links according to a predetermined criteria.

6. The method as recited in claim 1 wherein said step of obtaining a collection of web pages is further comprised of the step of obtaining a sample of documents according to a predetermined criteria.

7. A system for identifying related collections of linked documents, said system comprising means for accessing said documents in said collection of linked documents;

link analysis means for analyzing the links contained in said documents in said collection of linked documents, said link analysis means further comprising:
means for determining the number of times a collection of linked documents has been linked to; and
means for generating a co-citation list, said co-citation list indicating pairs of collections of linked documents that have been linked to by the same collection of linked documents;
clustering means for generating collection clusters from said co-citation list.

8. The system as recited in claim 7 wherein said clustering means performs a transitive closure operation.

9. The system as recited in claim 7 wherein said clustering means performs a statistical clustering operation.

10. The system as recited in claim 9 wherein said means for generating a co-citation list is further comprised of the step of generating a co-citation frequency for each pair in said list, said co-citation frequency indicating the number of times each of said pairs in said list were linked to by the same collection, and said statistical clustering operation utilizes said co-citation frequency.

11. The system as recited in claim 7 further comprising cluster display visualization means for providing a visual display of said generated document clusters.

12. The system as recited in claim 7 further comprising means for specifying a link frequency threshold between collections of linked documents.

13. A program storage device readable by a machine, tangibly embodying a program of instructions executable by the machine to perform method steps for the identifying related of collections of linked documents, said method steps comprising:

a) obtaining a list of documents having some predetermined relationship;

b) identifying a set of collections of linked documents from said list of documents;

c) creating a co-citation list, said co-citation list comprised of pairs of collections that are linked to by the same collection in said set of collections of linked documents; and d) performing a suitable clustering operation on said co-citation list to generate collection clusters, each of said collection clusters indicating a relationship amongst collections in said cluster.

* * * * *